United States Patent [19]
Huber

[11] Patent Number: 5,153,762
[45] Date of Patent: Oct. 6, 1992

[54] METHOD AND APPARATUS FOR RECOVERING AM CHANNELL SIGNALS DISTRIBUTED ON AN OPTICAL FIBER

[75] Inventor: David R. Huber, Warrington, Pa.

[73] Assignee: General Instrument Corporation, Hatboro, Pa.

[21] Appl. No.: 495,723

[22] Filed: Mar. 19, 1990

[51] Int. Cl.$^5$ .................. H04J 14/02; H04B 10/00
[52] U.S. Cl. ................... 359/125; 359/132; 359/162; 359/189
[58] Field of Search ........ 359/124, 125, 132, 189–191, 359/344, 162, 173; 358/86

[56] References Cited

U.S. PATENT DOCUMENTS

| 4,183,054 | 1/1980 | Patisaul et al. | 358/86 |
|---|---|---|---|
| 4,794,351 | 12/1988 | Darcie | 359/341 |
| 4,989,200 | 1/1991 | Olshanky et al. | 359/132 |
| 5,020,049 | 5/1991 | Bodeep et al. | 359/124 |

OTHER PUBLICATIONS

"Nonlinear Distortion Due to Optical Amplifiers in Subcarrier-Multiplexed Lightwave Communications Systems", A. A. M. Saleh et al., Electronics Letters, vol. 25, No. 1, pp. 79–80, 1989.
"Microwave-Multiplexed Wideband Lightwave Systems Using Optical Amplifiers for Subscriber Distribution", R. Olshansky et al., Electronics Letters, vol. 24, No. 15, pp. 922–923, 1988.
"Subcarrier Multiplexed Passive Optical Network for Low-Cost Video Distribution", R. Olshansky et al., presented at OFC 1989.
"Carrier-to-Noise Ratio Performance of a Ninety-Channel FM Video Optical System Employing Subcarrier Multiplexing and Two Cascaded traveling-Wave Laser Amplifiers", W. I. Way et al., presented at OFC 1989.
"Optical Mixer-Preamplifier for Lightwave Subcarrier Systems", T. E. Darci et al., Electronics Letters, vol. 24, No. 3, pp. 179–180, 1988.

Primary Examiner—Edward L. Coles, Sr.
Assistant Examiner—Kinfe-Michael Negash
Attorney, Agent, or Firm—Barry R. Lipsitz

[57] ABSTRACT

Individual AM channel signals are recovered in the optical domain from a band of signals distributed on an optical fiber. A semiconductor optical amplifier is coupled to receive the band of optical channel signals. The band is defined by a lowest channel frequency $f_L$ and a highest channel frequency $f_H$ wherein $f_H < 2f_L$. A local oscillator modulates the gain of the amplifier with a frequency that translates a selected channel signal to another frequency outside of the band for subsequent processing in the electrical domain.

20 Claims, 1 Drawing Sheet

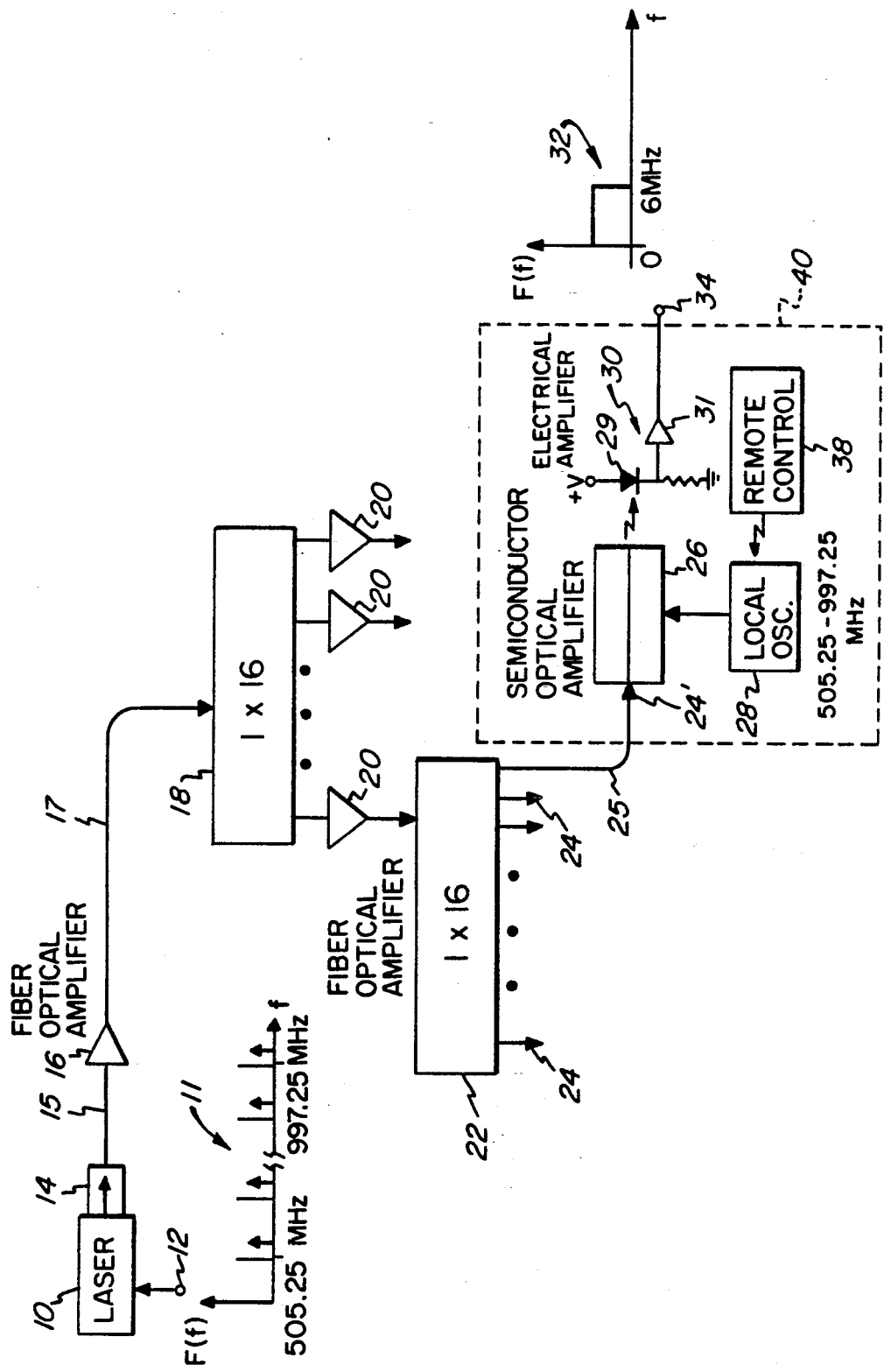

METHOD AND APPARATUS FOR RECOVERING AM CHANNELL SIGNALS DISTRIBUTED ON AN OPTICAL FIBER

BACKGROUND OF THE INVENTION

The present invention relates to fiber optic communication systems, and more particularly to a method and apparatus for recovering amplitude modulated vestigial-sideband ("AM-VSB") television signals from an optical fiber.

Cable television systems currently distribute television program signals via coaxial cable, typically arranged in tree and branch networks. Coaxial cable distribution systems require a large number of high bandwidth electrical amplifiers. For example, 40 or so amplifiers may be required between the cable system headend and an individual subscriber's home.

The use of a television signal comprising amplitude modulated vestigial-sideband video subcarriers is preferred in the distribution of cable television signals due to the compatibility of that format with NTSC television standards and the ability to provide an increased number of channels within a given bandwidth. An undesirable characteristic of AM-VSB transmission, however, is that it requires a much higher carrier-to-noise ratio (CNR) than other techniques, such as frequency modulation or digital transmission of video signals. Generally, a CNR of at least 40 dB is necessary to provide clear reception of AM-VSB television signals.

The replacement of coaxial cable with optical fiber transmission lines in television distribution systems has become a high priority. Production single mode fiber can support virtually unlimited bandwidth and has low attenuation. Accordingly, a fiber optic distribution system or a fiber-coax cable hybrid would provide substantially increased performance at a competitive cost as compared to prior art coaxial cable systems.

One problem in implementing an optical fiber distribution system, particularly for AM-VSB signals, is that semiconductor optical amplifiers of the type typically used in fiber optic systems produce high levels of distortion products that are not compatible with multi-channel AM-VSB video signals. This is due to the short lifetime of the carrier excited state within the semiconductor optical amplifier. The recombination time of such an amplifier operating near 1.3 $\mu$m or 1.5 $\mu$m is about 1.2 nanoseconds, which is short compared to the period of a typical AM-VSB subcarrier operating in the cable television band of about 55.25 MHz-1 GHz.

The dependence of second order distortion on carrier lifetime in a semiconductor optical amplifier is discussed in A.A.M. Saleh, et al., "Nonlinear Distortion Due to Optical Amplifiers in subcarrier-Multiplexed Lightwave Communications Systems", *Electronics Letters*. Vol. 25, No. 1, pp. 79-80, 1989. As noted in that article, second order nonlinear distortion is a significant problem in proposed lightwave cable television home distribution systems, where the use of semiconductor amplifiers to overcome inevitable distribution losses can potentially degrade system performance appreciably.

The difficulties presented in transmitting multi-channel AM-VSB television signals over fiber optic distribution systems have led others to propose the use of frequency modulation ("FM") instead of the more desirable AM-VSB format. See, e.g., R. Olshansky, et al., "Microwave-Multiplexed Wideband Lightwave Systems Using Optical Amplifiers for Subscriber Distribution", *Electronics Letters*, Vol. 24, No. 15, pp. 922-923, 1988; R. Olshansky, et al., "Subcarrier Multiplexed Passive Optical Network for Low-Cost Video Distribution", presented at OFC 1989; and W. I. Way, et al., "Carrier-to-Noise Ratio Performance of a Ninety-Channel FM Video Optical System Employing Subcarrier Multiplexing and Two Cascaded Traveling-Wave Laser Amplifiers", presented at OFC 1989. Another proposal has been to convert AM-VSB signals to a digital format for transmission. Digital transmission of AM-VSB television signals over an optical communication link is described in U.S. Pat. No. 4,183,054 to Patisaul, et al., entitled "Digital, Frequency-Translated, Plural-Channel, Vestigial Sideband Television Communication System".

An apparatus and method for transmitting AM-VSB television signals over a fiber optic distribution system in analog form is disclosed in commonly assigned copending U.S. Pat. application Ser. No. 07/454,772 entitled "Transmission of AM-VSB Video Signals Over an Optical Fiber", and incorporated herein by reference. That application discloses the modulation of light from a light source, such as a laser, with a signal having an AM-VSB subcarrier. The modulated light is passed through an optical amplifier having a long excited state lifetime with respect to the period of the subcarrier. The amplified modulated light output from the amplifier is coupled to an optical fiber which provides distribution of the signal to, for example, cable television subscribers. In a preferred embodiment, the optical amplifier is a doped fiber amplifier such as an Erbium-doped fiber amplifier.

When a plurality of AM-VSB signals are transmitted over an optical fiber, there must be some means for recovering each of the individual signals (e.g., television channels) at each subscriber location coupled to the distribution network. One way to accomplish this in the electrical domain is to convert the optical signals received at the subscriber location to electrical signals, and input the electrical signals to a conventional receiver to tune, demodulate, and reproduce a desired channel. There has heretofore been no way to efficiently recover individual AM-VSB channel signals in the optical domain instead of in the electrical domain.

The use of a semiconductor optical amplifier as an optical mixer has been suggested for the recovery of angle modulated subcarrier information, i.e., frequency or phase modulation. See, T.E. Darci, et al, "Optical Mixer-Preamplifier for Lightwave Subcarrier Systems", *Electronic Letters*, 1988, Vol. 24, pp. 179-180. There is no suggestion of using such a scheme for conversion of AM subcarrier modulation. The use of semiconductor optical amplifiers in an AM system has not been previously considered due to the incompatibility of such amplifiers with AM signal distribution as noted above. In particular, a semiconductor optical amplifier adds intermodulation distortion products when amplifying amplitude modulated subcarriers. Such distortion has been previously believed to render such amplifiers unusable for AM applications.

It would be advantageous to recover an individual AM-VSB channel in the optical domain, and then convert the recovered signal to the electrical domain for final processing. Such a technique would allow optical fiber distribution all the way to a subscriber's home. It would also simplify the necessary subscriber apparatus and provide increased reliability at a potentially lower cost.

It would be further advantageous to provide a method and apparatus for using a semiconductor optical amplifier as a mixer for the conversion of AM subcarrier modulation. Any such method and apparatus would have to overcome the effects of nonlinear distortion introduced by the amplifier. The amplifier could then be used as an optical mixer to allow recovery of individual AM channel signals in the optical domain. The present invention provides such a method and apparatus.

SUMMARY OF THE INVENTION

In accordance with the present invention, a method is provided for distributing multi-channel AM subcarrier modulated information on an optical fiber for subsequent recovery. A plurality of AM channel signals is transmitted in a frequency band defined by a lowest channel frequency $f_L$ and a highest channel frequency $f_H$ wherein $F_H < 2f_L$. A light source is intensity modulated with the band of signals to provide an AM subcarrier modulated optical signal. The optical signal is transmitted over an optical fiber, and received at a subscriber location. The received signal is amplified in a semiconductor optical amplifier, and the amplifier is modulated at a local oscillator frequency to translate a channel signal contained in the received signal to a predetermined frequency for recovery. In a preferred embodiment, the local oscillator frequency is chosen to translate the channel signal to baseband. In an alternate embodiment, the channel frequency is translated to an intermediate frequency.

The local oscillator frequency is tunable to selectively recover different channel signals from the plurality of transmitted signals. The channel signals can comprise AM-VSB video signals transmitted over an optical fiber cable television network, wherein the frequency band of the cable television channels extends from about 505.25 MHz to 997.25 MHz. Optical channel signals output from the amplifier are converted to electrical signals for recovery by a television receiver.

Apparatus is provided for recovering individual AM channel signals from a band of signals distributed on an optical fiber. A semiconductor optical amplifier having a gain is provided. The amplifier is coupled to receive a plurality of AM optical channel signals from an optical fiber in a frequency band defined by a lowest channel frequency $f_L$ and a highest channel frequency $f_H$ wherein $f_H < 2f_L$. A local oscillator provides an output frequency that is used to modulate the gain of the amplifier. This modulation translates a channel signal in the plurality of received signals to another frequency outside of the band for output from the amplifier. Means are provided for converting a translated optical channel signal output from the amplifier to an electrical signal. The converting means can comprise a photodetector.

In a preferred embodiment, the channel signals comprise AM-VSB video signals and the local oscillator is tunable to selectively recover individual channel signals for input to a television receiver.

BRIEF DESCRIPTION OF THE DRAWING

The FIGURE is a block diagram illustrating an AM optical fiber distribution system, incorporating an optical mixer-preamplifier at a subscriber location in accordance with the present invention.

DETAILED DESCRIPTION OF THE INVENTION

The present invention provides recovery of AM subcarrier modulation in the optical domain from signals carried on an optical fiber network. One application for the present invention is in the distribution and recovery of AM-VSB television signals in a fiber optic cable television system. An example of such a system is shown in the figure. A laser 10 is intensity modulated at an input terminal 12 with an input channel signal spectrum 11 containing 83 six MHz wide television channels carried in a frequency band extending from 505.25 MHz to 997.25 MHz. Laser 10 can comprise, for example, a DFB laser or external cavity laser that is directly modulated with the RF signal spectrum input at terminal 12, as well known in the art. An isolator 14 receives light from the laser and prevents optical reflections, allowing the laser to operate in a stable manner. Those skilled in the art will appreciate that other types of modulated light sources can be substituted for laser 10. For example, a semiconductor laser or other laser can be coupled to pass a coherent light beam at a specified wavelength through optical isolator 14. Instead of directly modulating the laser, an external modulator, such as a Mach Zehnder modulator, can be used to modulate a laser beam with the RF signal spectrum, as well known in the art.

The modulated light signal from optical isolator 14 is coupled to an optical fiber 15. The light signal from the fiber is connected to a fiber optical amplifier 16, such as an Erbium-doped fiber amplifier. The output of fiber optical amplifier 16 is coupled via optical fiber 17 to a first optical fiber splitter 18. Splitter 18 can split the incoming signal into any number of outputs. For purposes of illustration, a 1×16 splitter is shown. Splitter 18 will result in a signal loss, which may, for example, be on the order of 14 dB. If fiber optical amplifier 16 is selected to provide a +13 dBm output level, the light signal at the outputs of splitter 18 will be at a nominal level of −1 dBm. Another 3 dB of link loss is allowed in the fiber optic coupling between the output of splitter 18 and the input of another fiber optical amplifier 20. As shown in the FIGURE, each of the outputs splitter 18 is coupled to a fiber optical amplifier 20, which in turn may be coupled to another splitter in the distribution network.

A splitter 22 is illustrated with respect to one of the outputs of splitter 18. By providing fiber optical amplifier 20 with a gain of 17 dBm, the accumulated 4 dB loss at the input of amplifier 20 is compensated for, and the signal strength at the input of splitter 22 is again +13 dBm with respect to the original signal strength. Gain, noise and power characteristics of the fiber can be adjusted to be mutually compatible by adjusting various parameters including pump power, rare earth dopant concentration, fiber length and rare earth dopant profile.

The signals input to 1×16 splitter 22 are output on output ports 24. Any number of splitters can be combined in the distribution network to provide signal distribution to various subscribers. In the example illustrated in the FIGURE, only two splitters are shown. One of the output ports 24' of splitter 22 is coupled via optical fiber 25 to an individual subscriber box 40 which sits on top of the subscriber's television set.

Subscriber unit 40 contains a semiconductor optical amplifier 26 which, in accordance with the present invention, is modulated using a local oscillator 28 to recover individual television channel signals within the signal spectrum received at port 24'. In a preferred embodiment, local oscillator 28 is a variable frequency oscillator, such as a voltage controlled oscillator ("VCO"). The subscriber is provided with channel selection means, such as a conventional remote control 38, that allows the local oscillator to be tuned to select individual channels for viewing. Where individual channel signals are to be recovered at baseband, local oscillator 28 can be tuned, for example, to output a frequency of 505.25 MHz for mixing with the input signal spectrum at port 24'. The mixing of the signals will translate the first channel in signal spectrum 11 to baseband, in accordance with well known frequency shifting principles. Those skilled in the art will appreciate that intermediate frequency ("IF") signal processing can be alternately used to recover signals at an intermediate frequency instead of at baseband.

Semiconductor optical amplifier 26 outputs the selected, translated channel signal to an electrical amplifier generally designated 30. The electrical amplifier comprises a conventional photodetector circuit 29 that receives the optical signal output from optical amplifier 26 and converts it to an electrical signal for input to an electrical amplifier 31. The selected converted channel signal is then output as an electrical signal on terminal 34 for receipt by a subscriber's television receiver. As indicated by output frequency spectrum 32, the signal output on terminal 34 is a standard television channel signal having a 6 MHz bandwidth.

In order for the semiconductor optical amplifier 26 to be used as a mixer for the recovery of AM subcarrier modulation, it is necessary to remove the effects of nonlinear distortion introduced by the amplifier. In order to accomplish this, a frequency plan is used for the AM-VSB modulated television channel signals such that the second order products introduced by the optical amplifier fall outside of the frequency band used for the television signals. Therefore, the method and apparatus of the present invention provides the AM television channel signals in a frequency band defined by a lowest channel frequency $f_L$ and a highest channel frequency $f_H$ wherein $f_H < 2f_L$. In other words, the frequency band for the transmitted signals must start at a frequency that is higher than the bandwidth of all the transmitted signals. Thus, where it is desired to transmit 83 different television channels, each having a 6 MHz bandwidth, the minimum bandwidth requirement for all of the signals is 83×6 MHz=498 MHz. In accordance with the present invention, the 83 channels must be transmitted in a frequency band that starts above 498 MHz. For example, the frequency band from 505.25 MHz to 997.25 MHz can be used. This band meets the requirement that $f_H$ (997.25)<2 $f_L$ (1010.50 MHz). It is noted that the last channel in the 505.25 to 997.25 MHz band extends 6 MHz above 997.25 MHz, to 1003.25 MHz. This upper frequency is still within the $f_H<2f_L$ requirement.

The 83 channel example set forth above places all second order distortion products introduced by the semiconductor optical amplifier out-of-band using carriers that fall within a single octave. The second order products 2A, 2B, A−B, and A+B all fall outside the 505.25 MHz to 997.25 MHz band, where A and B are any two channel frequencies. The AM subcarrier scheme can be illustrated mathematically as follows:

A subcarrier signal L(t) can be represented by the formula:

$$L(t) = L_i[1 + \Sigma l_i(t)]$$

where $L_i$ is the average value of the light intensity, and $l_i$ is defined as:

$$l_i(t) = \alpha_i(t)\cos(\Omega_i t).$$

$\alpha_i$ is the AM modulation index and $\Omega_i$ is the RF subcarrier frequency of the $i$th channel. The gain of the semiconductor optical amplifier 26 can be expressed as G(t) where:

$$G(t) = G_o[1 + \Gamma\cos(\Omega_{10} t)]$$

where $\Gamma$ is the gain modulation depth and $\Omega_{10}$ is the local oscillator frequency. The mixing products due to an individual subcarrier $l_i(t)$ are the product of L(t) and G(t), as follows:

$$L(t)G(t) = G_o L_i[\alpha_i(t)\cos(\Omega_i t) + \Gamma\cos\Omega_{10}t + \tfrac{1}{2}\alpha_i(t)\Gamma\cos(\Omega_i \pm \Omega_{10})t]$$

Selecting $\Omega_{10} < \Omega_i$ and choosing the −1 term yields:

$$v(t) = \alpha_i(t)\tfrac{1}{2}\Gamma^*\cos(\Omega_i - \Omega_{10})t$$

If $\Omega_{10}$ is selected such that $\Omega_{10} = \Omega_i$ the channel can be recovered at baseband. If IF signal processing is desired, $\Omega_{10}$ is selected so that $(\Omega_i - \Omega_{10}) \div (2\pi)$ is the desired IF frequency.

As noted, the semiconductor optical amplifier adds intermodulation distortion products when amplifying amplitude modulated subcarriers. The distortion products are inversely proportional to $P_s$, the 3 dB saturation power of the optical amplifier. The distortion products are also inversely proportional to the term:

$$[1 + (\Omega_i \tau_c)^2]$$

where $\tau_c$ is the amplifier spontaneous emission carrier lifetime. If $\Omega_i \tau_c$ is large compared to 1, the distortion products are small.

In addition to minimizing distortion by increasing amplifier saturation power, decreasing the overall light intensity, or increasing the RF subcarrier frequency $\Omega_i$, the undesirable effects of 2nd order nonlinear distortion are overcome in accordance with the present invention by using an AM frequency plan where all of the second order distortion products fall out of the television channel band.

Semiconductor optical amplifiers for use in connection with the present invention are available in the marketplace. For example, the Toshiba Model TOLD350 amplifier may be used. This amplifier can be directly modulated via an injection current port provided on the device.

It will now be appreciated that the present invention provides a method and apparatus for distributing multichannel AM subcarrier modulated information on an optical fiber for subsequent recovery at a subscriber location. A semiconductor optical amplifier is used as an optical mixer to recover a single television channel from a fiber optic network. The entire network, from the laser transmitter to the output of the semiconductor optical amplifier, has zero electrical bandwidth. The bandwidth required at the output of the semiconductor optical amplifier is only the bandwidth required by the baseband video and any accompanying subcarriers. As a result, the present invention provides a system having low cost and high reliability, and enables the servicing of subscribers by optical fibers run all the way to the home. Tuning of individual channels in the optical domain at each subscriber location simplifies signal recovery substantially, and eliminates much of the electrical circuitry previously required at each subscriber location for the selection and recovery of individual channel signals.

Although the invention has been described in connection with a preferred embodiment thereof, those skilled in the art will appreciate that numerous adaptations and modifications may be made thereto without departing from the spirit and scope of the invention as set forth in the following claims.

What is claimed is:

1. A method for distributing multichannel AM subcarrier modulated information on an optical fiber for subsequent recovery comprising the steps of:

providing a plurality of AM channel signals in a frequency band defined by a lowest channel frequency $f_L$ and a highest channel frequency $f_H$ wherein $f_H < 2f_L$;

intensity modulating a light source with said band of signals to provide an AM subcarrier modulated optical signal;

transmitting said optical signal over an optical fiber;

receiving the transmitted optical signal from said fiber;

amplifying the received signal in a semiconductor optical amplifier; and modulating said amplifier at a local oscillator frequency to translate a channel signal contained in the received signal to a predetermined frequency for recovery.

2. The method of claim 1 wherein said local oscillator frequency is chosen to translate the channel signal to baseband.

3. The method of claim 1 comprising the further step of:

tuning said local oscillator frequency to selectively recover different channel signals from said plurality.

4. The method of claim 3 comprising the further step of:

converting an optical channel signal output from said amplifier to an electrical signal for recovery by a receiver.

5. The method of claim 4 wherein said channel signals comprise AM-VSB video signals.

6. The method of claim 5 wherein said frequency band extends from about 505.25 MHz to 997.25 MHz.

7. The method of claim 1 wherein said channel signals comprise AM-VSB video signals.

8. Apparatus for recovering individual AM channel signals from a band of signals distributed on an optical fiber comprising:

a semiconductor optical amplifier having a gain;

means for coupling said amplifier to receive a plurality of AM optical channel signals from an optical fiber in a frequency band defined by a lowest channel frequency $f_L$ and a highest channel frequency $f_H$ wherein $f_H < 2f_L$;

a local oscillator; and means for modulating the gain of said amplifier with a frequency output from said local oscillator, wherein said modulation translates a channel signal in said plurality to another frequency outside said band for output from the amplifier.

9. The apparatus of claim 8 further comprising:

means for converting a translated optical channel signal output from the amplifier to an electrical signal.

10. The apparatus of claim 9 wherein said converting means comprises a photodetector.

11. The apparatus of claim 10 wherein said channel signals comprise AM-VSB video signals.

12. The apparatus of claim 11 further comprising:

means for coupling a converted channel signal output from said photodetector to a television receiver.

13. The apparatus of claim 11 further comprising:

means for tuning said local oscillator output frequency to selectively recover individual channel signals from said plurality.

14. The apparatus of claim 8 wherein said channel signals comprise AM-VSB video signals.

15. The apparatus of claim 14 further comprising:

means for tuning said local oscillator output frequency to selectively recover individual channel signals from said plurality.

16. The apparatus of claim 8 further comprising:

means for tuning said local oscillator output frequency within a predetermined range to selectively translate individual channel signals from said plurality to baseband.

17. The apparatus of claim 16 wherein said channel signals comprise AM-VSB video signals.

18. The apparatus of claim 17 further comprising:

means for converting a baseband optical channel signal output from the amplifier to an electrical signal.

19. The apparatus of claim 18 wherein said converting means comprises a photodetector.

20. The apparatus of claim 19 further comprising:

means for coupling a baseband electrical channel signal output from said photodetector to a television receiver.

* * * * *